Nov. 4, 1930.　　　M. W. H. WILSON　　　1,780,215
WIRE WHEEL ASSEMBLY DEVICE
Filed June 10, 1929　　　2 Sheets-Sheet 1
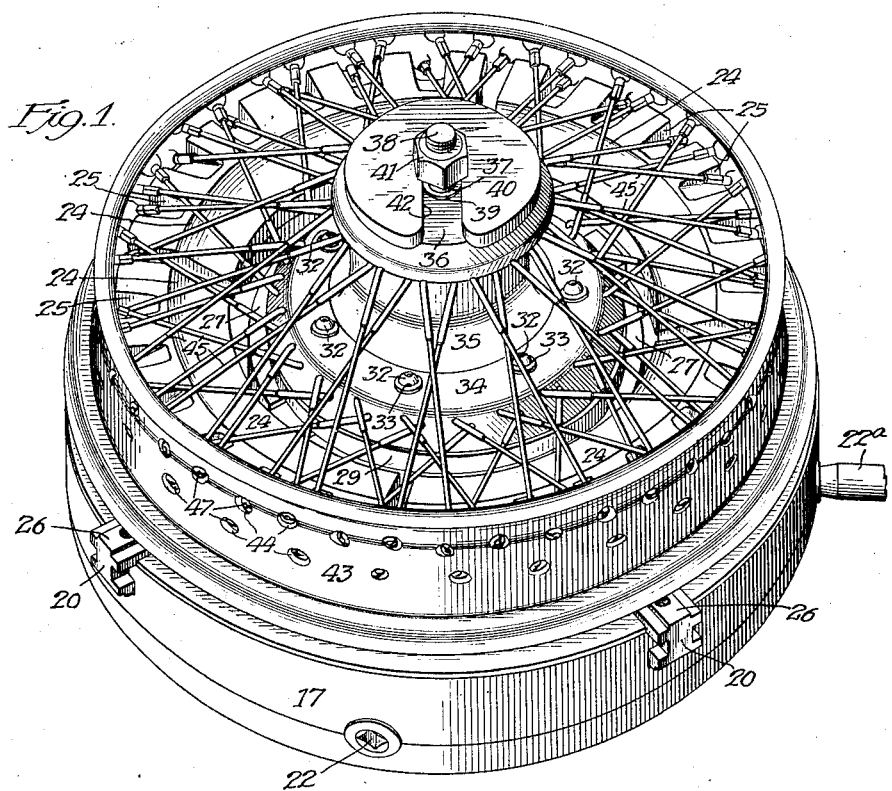
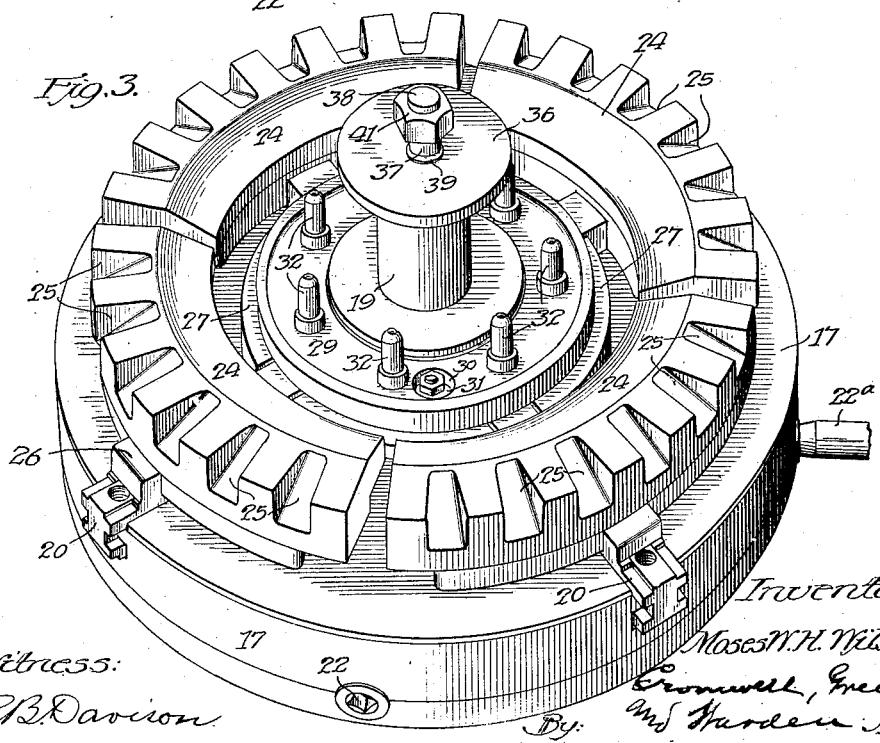

Nov. 4, 1930.     M. W. H. WILSON     1,780,215
WIRE WHEEL ASSEMBLY DEVICE
Filed June 10, 1929     2 Sheets-Sheet 2
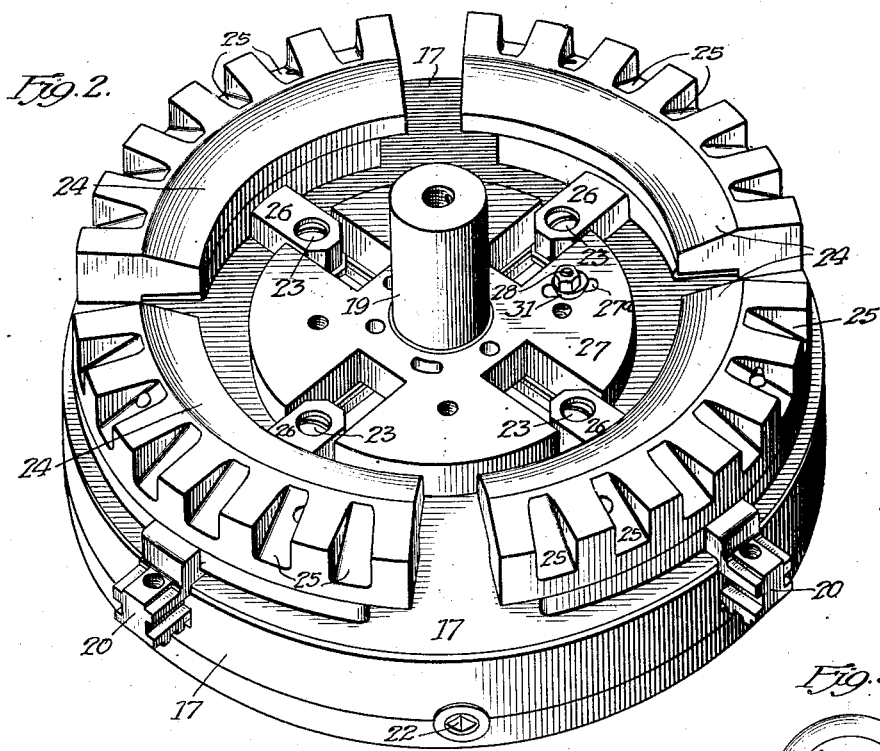
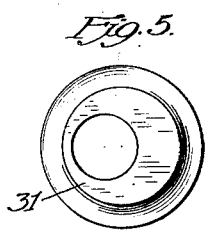
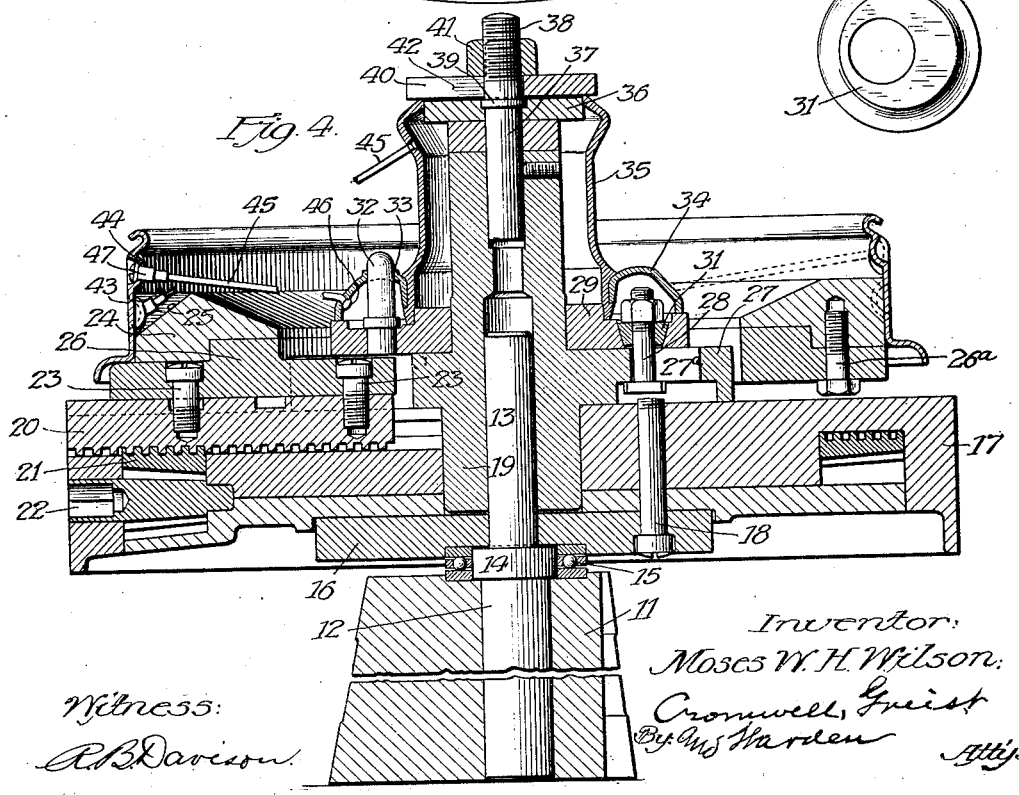
Inventor:
Moses W. H. Wilson
Cromwell, Greist
By Wm J Harden
Attys.
Witness:
R. B. Davison Patented Nov. 4, 1930

1,780,215

UNITED STATES PATENT OFFICE

MOSES W. H. WILSON, OF EAST LANSING, MICHIGAN, ASSIGNOR TO MOTOR WHEEL CORPORATION, OF LANSING, MICHIGAN, A CORPORATION OF MICHIGAN

WIRE-WHEEL-ASSEMBLY DEVICE

Application filed June 10, 1929. Serial No. 369,728.

My invention has to do with the assembling of the constituent parts of wheels and particularly wire wheels, wherein difficulty has been presented by the necessity of so lacing the wire spokes connecting the hub and rim that they shall be under uniform tension with the hub and rim members in exact relationship as to concentricity, angularity and as to respective planes. By "lacing" is here meant the tightening of the spokes as distinguished from the act of threading the same in the hub and rim apertures.

The solution of these problems have been heretofore dependent upon the skill of the workman using repeated try-out methods, tensioning, testing, retensioning or loosening until the parallelism of the planes, the concentricity of the parts and approximately uniform spoke tension is obtained so such degree as to satisfy the workman and the inspector. This "cut-and-fit" method is often unsatisfactory as to results and of necessity is expensive from the standpoint of labor cost.

By my invention the personal equation is largely eliminated and the excellence of the product is to a considerable extent made independent of the experience and skill of the workman.

According to the present method the basic parts of a wire wheel, the hub and the rim, are removably clamped in the relative positions they are to occupy in the finished wheel, the wire spokes having been previously seated loosely with their heads engaged within apertures provided in the hub member and their outer ends threaded loosely through the apertures provided in the rim member, and the nipples loosely applied. After clamping in the device, the nipples are turned home by means of a suitable tool such as a friction-driven screw driver or wrench, whereby each spoke will be placed under approximately the same amount of tension. The completely laced wheel will only then be released from the clamping means, when it will be found to be in substantially true alignment.

In order that the device of the invention and the method of practicing the same may be understood readily by those skilled in the art, a preferred embodiment of such device is set forth in the drawings, and upon the basis of such disclosure the method is described. It will be understood that modifications of the device, without sacrificing in substantial measure its advantages or materially altering the practice of the invention, will be apparent to those acquainted with this art, wherefore the drawing and the description are to be taken in an illustrative sense and not as limiting the invention other than indicated by the appended claims.

In the drawings

Fig. 1 represents in perspective the improved device with a wheel thereon fully assembled;

Fig. 2 is a similar view disclosing those portions of the device ordinarily hidden by the superstructure;

Fig. 3, likewise in perspective, illustrates the complete device ready for the application of the wheel members thereto for assembly;

Fig. 4 is a vertical section through Fig. 1; and

Fig. 5 is a plan view of means for effecting angular relative adjustment of the hub clamping and the rim clamping members.

Having reference to the several figures of the drawing, the preferred embodiment of my assembly device therein illustrated comprises a stationary base 11 having seated therein an upright standard including a lower portion 12, an upper reduced portion 13 and an intermediate enlargement 14. A ball bearing 15 is disposed about the enlargement 14 between the base 11 and a bed comprising a plate 16 and a superposed bed frame 17 coupled together by means of bolts 18 for rotation with the sleeve axle 19 about the reduced portion 13 of the standard.

Guided for radial movement within the bed 17 are shown four chuck jaws 20, the under faces of which are formed as toothed racks with which engage worm screws 21 in mesh with pinions 22 having sockets for engagement by a suitable wrench 22ª, whereby upon the rotation of the pinions the chucks are advanced or retracted in a radial direction.

Secured to the upper faces of the radially movable chucks by screws 23 are four chuck jaw extensions 26 to which are attached by means of screws 26ª four sectors 24 provided on their upper outer faces with cutaway portions 25 forming radial gaps which serve as clearance spaces for the forward group of wire spokes during the assembly operation. These sectors are interchangeable with other sector groups and are adapted for ready removal and substitution to adapt the device for the assembly of wheels having a greater or less number of spokes. Plate 27 forms a lateral horizontal extension of the sleeve axle 19, which plate 27 is provided with a radial slot 27ª through which extends a bolt 28 and its head engaging the underside of the plate 27 at each side of the said slot.

Rotatably mounted upon the upper face of the plate 27 and about the upper extension of the sleeve axle 19 is a hub-supporting bed plate 29 containing an aperture 30 within which is seated a cam or eccentric bushing 31 about the bolt 28.

It will be understood that by shifting the bushing angularly within the aperture 30, the axis of the bolt 28 is shifted laterally within the slot 27ª and the relative position of the bed plate 29 is shifted angularly upon its axis with reference to the position of the plate 27, the chucks 20 and the sectors 24. This adjustment is necessary only upon a substitution of sectors in order to bring into proper relationship the spoke apertures of the hub and of the rim, and the adjustment is preferably made concurrently with the seating of the plate 29 upon the plate 27 and the tightening of the nut upon the bolt 28.

The hub-supporting plate 29 has projecting upwardly a series of studs 32 which correspond in number and position and are adapted to enter the bolt holes 33 provided in the annulus 34 of the hub for the mounting of the completed wheel upon a car. These studs 32 serve accurately to position the hub upon the plate 29 and to prevent lateral or angular shifting of the hub and plate. The open end of the hub barrel 35 is closed by a plate 36 which rests upon the upper end of the sleeve axle 19, being centered thereon by means of the pin 37 having an upper threaded end 38 and an intermediate shoulder or enlargement 39 which rests upon the closure plate 26.

Prior to the placing of the hub upon its support 29 and clamping in position, the forward and rear groups of spokes 45 will have been threaded through the apertures in the annulus 34 with their heads 46 engaging their seats in the inner wall of the annulus and the outer ends of said spokes will have been individually threaded through the proper apertures in the rim and the screw nipples started thereon.

Sectors 24, corresponding to the wheel to be assembled, are mounted upon the chuck jaw extensions 26 and secured by screws 26ª and the proper angular relationship between said sectors and the hub-supporting plate 29 attained by means of the cam bushing 31.

The hub with the spokes loosely disposed therein is positioned upon the studs 32 with its upper end closed by the plate 36 and a clamping plate 40 is superposed upon the open end of the hub barrel and clamped thereon by the nut 41. In order to obviate the necessity of entirely removing the nut 41, the clamping plate 40 is preferably provided with a radial slot 42, by means of which the clamping plate can be applied and removed in a lateral direction.

The wheel rim 43 rests upon the outer lip of the chuck jaw extensions 26 surrounding the several sectors 24 and is firmly clamped in this position by the uniform advancing of the chuck jaws 20 radially outward by turning the wrench within the sockets 22.

The position of the rim 43 about the sectors 24 will be such that the lower spoke apertures 44 will coincide radially with the cutaway portions 25 of the sectors in order that such spokes extending from the hub to the lower portion of the rim will be accommodated within such cutaway portions.

The screw nipples 47 having been previously loosely applied to the projecting outer ends of the spokes, the nipples are now screwed home by means of a screw driver or wrench while the hub and rim are held firmly in clamped position. By applying for this purpose a friction-driven tool, the tension applied to the spokes 45 by the nipples 47 is made substantially uniform, the friction drive being overcome by the resistance when a given spoke tension is reached.

It only remains to subject the wheel to inspection for alignment and to effect a final truing by hand, and to clip such spoke ends as may project beyond the nipples 47, this operation being reduced to a minimum by reason of the substantial uniformity of the assembly, as distinguished from the former methods of assembly which required the use of more latitude in spoke length for effecting final alignment subsequent to the assembly.

It will be readily appreciated that by my invention guess-work is eliminated from the assembly of wire wheels, the hub and rim parts being clamped accurately and firmly in the position which they are ultimately to occupy in reference to each other and their approximately uniform tension assured by the tightening of the nipples when the hub and rim are held firmly in proper relative position.

I claim:

1. A device for assembling wire wheels comprising clamping members to hold the hub and rim in predetermined ultimate relative positions while lacing the wheel, said hub and rim clamping members relatively adjustable as to respective planes and angularly in such planes.

2. A device for assembling wire wheels comprising relatively adjustable clamping members to hold the hub and rim in predetermined ultimate relative positions while lacing the wheel, said device providing radial gaps to accommodate the spokes, said hub and rim clamping members relatively adjustable as to respective planes and angularly in such planes.

3. A device for assembling wire wheels comprising a bed, a hub-clamping member mounted on said bed and including positioning studs adapted to enter the bolt holes of the hub, a rim-clamping member comprising radially adjustable chucks for engaging the rim, means for angularly adjusting the hub-clamping member on the bed, means for adjusting the chucks radially, means for positioning the hub on the hub clamp and means for positioning the rim on the rim clamp.

4. A device for assembling wire wheels comprising a bed, a hub-clamping member angularly adjustable on said bed and including positioning studs adapted to enter the bolt holes of the hub, a rim-clamping member comprising distinct radially adjustable chucks for engaging in extended position the inside of the rim, said chucks carrying interchangeable sectors for different types of wheels provided with radial gaps for spokes, means for angularly adjusting the hub-clamping member on the bed comprising a cam element, means for concurrently adjusting the chucks radially, means for positioning the hub on the hub clamp and means for positioning the rim on the rim clamp.

5. A device for assembling wire wheels comprising a stationary support, a standard rising vertically therefrom, a bed frame rotatably mounted on the support about the standard, chucks mounted for radial movement in the bed frame and having one face formed as a rack, gear members mounted in the frame and engaging the racks for advancing and retracting the chucks concurrently, sectors removably carried by the chucks for clamping the inside of a wheel rim when the chucks are in advanced position and releasing the rim when the chucks are retracted, a hub-supporting bed plate concentrically disposed within the sectors, the hub-supporting plate having upstanding positioning studs for engaging within bolt holes of the hub, and releasable means for clamping the hub upon the supporting plate.

6. A device for assembling wire wheels comprising a stationary support, a standard rising vertically therefrom, a bed frame rotatably mounted on the support about the standard, chucks mounted for radial movement in the bed frame and having one face formed as a rack, gear members mounted in the frame and engaging the racks for advancing and retracting the chucks in unison, sectors removably carried by the chucks for clamping the inside of a wheel rim when the chucks are in advanced position and releasing the rim when the chucks are retracted, said sectors provided with marginal clearance gaps for the spokes, the chucks and sectors being centered about the standard, a plate having a vertically projected sleeve portion, a hub-supporting bed plate concentrically disposed within the sectors, means for adjusting the hub-supporting plate angularly comprising a cam member seated within an aperture thereof and a bolt disposed eccentrically within the cam and engaging within a slot of the underlying bed plate, the hub-supporting plate having upstanding positioning studs for engaging within bolt holes of the hub and releasable means for clamping the hub upon the supporting plate, said means comprising a shouldered pin seated within the sleeve portion of the plate, a clamping plate adapted to bear on the shoulder and on the hub barrel, and a nut threaded on the pin and engaging the clamping plate.

7. The method of lacing wire wheels which consists in threading the wire spokes through the hub and rim apertures, loosely applying the securing nipples, clamping the hub and rim in predetermined fixed relative positions, and tightening the nipples to place the spokes automatically under approximately uniform tension while so clamped.

8. The method of lacing wire wheels which consists in threading the wire spokes through the hub and rim apertures with their heads seated on the inner face of the hub, and their threaded ends projecting through the rim apertures, loosely applying the nipples to the threaded ends of the spokes to secure initial spoke tension sufficient to hold the spoke heads in their seats, clamping the hub and rim in predetermined fixed relative positions, and then tightening the nipples to place the spokes under approximately uniform final tension while so clamped.

In testimony whereof I have hereunto subscribed my name.

MOSES W. H. WILSON.